F. H. BROWN.
Cotton-Planter.
No. 55,811.
Patented June 26, 1866.
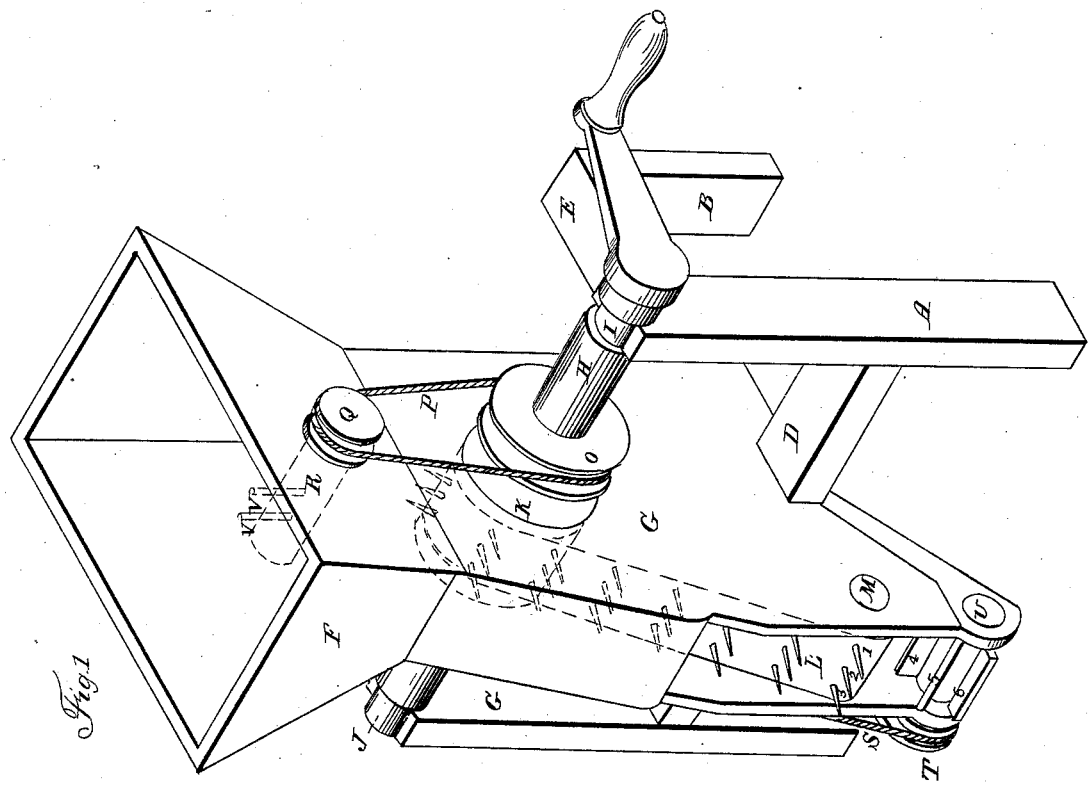

UNITED STATES PATENT OFFICE.

FREDRICK H. BROWN, OF CHICAGO, ILLINOIS.

IMPROVEMENT IN COTTON-SEED PLANTERS.

Specification forming part of Letters Patent No. 55,811, dated June 26, 1866.

*To all whom it may concern:*

Be it known that I, FREDRICK H. BROWN, of Chicago, in the county of Cook and State of Illinois, have invented a new and useful Improvement in Cotton-Seed Planters; and I do hereby declare and make known that the following is a full, clear, and exact description of the same, reference being had to the accompanying drawings, and the letters and figures marked thereon, which form part of this specification.

The object of my said invention is to separate the clusters or bunches of seeds, as cotton-seeds adhere together in bunches naturally, on account of fibrous cotton surrounding the shell of each seed, and distribute and deposit the same uniformly and singly in the ground as the machine is moved along over the field, which results are accomplished by means of the devices hereinafter described.

To enable those skilled in the art to understand how to construct and use my invention, I will proceed to describe the same with particularity, making reference in so doing to the aforesaid drawing, in which the figure represents a perspective view of my invention.

I have shown and shall describe only the operating parts of the cotton-seed planter, which may be suitable mounted upon any appropriate carriage, as is the case with ordinary planting-machines.

F represents the hopper of the machine, into which the seeds are placed, which rests upon and is secured to the upper part of an inclosure, (marked G,) in which is arranged an endless-belt conveyer, which carries the seed down to and deposits it in the ground, as hereinafter described.

H represents a shaft supporting the upper end of the conveyer aforesaid, which is marked L, resting in suitable bearings at I and J, as shown, the lower end of said conveyer passing around a shaft at M, so that the revolution of the upper shaft, H, causes the belt to move from beneath the hopper down to the ground, as desired. Upon said belt L are arranged any suitable number of spikes or teeth, 1 2 3, to carry the fibrous covered seeds down to the ground.

R represents a shaft passing through the hopper F, as shown, provided with teeth or agitating-arms V, whose revolution in the hopper and among the cotton-seeds has the effect to tear apart and separate the clusters of seeds, so that the seeds fall upon the conveyer separately, and are so deposited in the ground uniformly and regularly, as desired.

The power applied in any suitable manner to the shaft H by means of the cord or belt P revolves the said shaft R in the hopper, as described, and the seeds, being separated by said agitators or arms V, are deposited upon said belt L, and carried thereby down to and dropped into the appropriate drills or furrows therefor.

U represents a winged shaft, which is arranged just below and at the lower end of the conveyer, and is revolved by means of a belt or cord, S, passing around said shaft U, and also the shaft R, hereinbefore mentioned, so that the same power which revolves the shafts H and R also revolves the shaft U, whose revolution, by the action of the said wings 4 5 6, operates to detach the seeds from the spikes or teeth 1 2 3, should they be inclined to adhere thereto, and thus insure the regular deposit of the seeds in the ground, as desired.

Having described the construction and operation of my invention, I will now specify what I claim and desire to secure by Letters Patent.

I claim—

1. In a cotton-seed planter, the combination of the shaft R, provided with arms V, and the conveying-belt L, provided with teeth, as described, arranged and operating substantially in the manner and for the purposes herein specified.

2. In combination with the said conveying-belt L, the shaft U, provided with suitable wings or cleaners, arranged and operating substantially as specified and shown, and for the purpose set forth.

3. The combination of the shaft R, provided with arms or spikes, the toothed belt L, and the winged shaft U, arranged and operating as and for the purposes described.

FREDRICK H. BROWN.

Witnesses:
W. E. MARRS,
J. W. HERTHEL.